United States Patent [19]

Curtin

[11] Patent Number: 4,817,440

[45] Date of Patent: Apr. 4, 1989

[54] COMPLIANT TACTILE SENSOR

[75] Inventor: Mark Curtin, Cambridge, Mass.

[73] Assignee: The Board of Governors for Higher Education, State of Rhode Island and Providence Plantations, Providence, R.I.

[21] Appl. No.: 60,941

[22] Filed: Jun. 9, 1987

Related U.S. Application Data

[63] Continuation of Ser. No. 789,073, Oct. 18, 1985, abandoned.

[51] Int. Cl.[4] .......................... B25J 13/08; G01B 7/18
[52] U.S. Cl. .................................. 73/862.04; 294/907; 901/33; 901/46
[58] Field of Search ..................... 414/730; 901/33, 46; 73/865.7, 862.04, 172; 294/907

[56] References Cited

U.S. PATENT DOCUMENTS

| | | | |
|---|---|---|---|
| 3,535,711 | 10/1970 | Fick | 901/33 X |
| 4,208,648 | 6/1980 | Naumann | 901/46 X |
| 4,521,685 | 6/1985 | Rebman | 901/33 X |
| 4,555,954 | 12/1985 | Kim | 901/33 X |
| 4,575,297 | 3/1986 | Richter | 414/730 X |

FOREIGN PATENT DOCUMENTS

| | | | |
|---|---|---|---|
| 164230 | 8/1985 | Japan | 73/862.04 |
| 643322 | 1/1979 | U.S.S.R. | 901/46 X |
| 709357 | 1/1980 | U.S.S.R. | 294/907 |
| 1006210 | 3/1983 | U.S.S.R. | 294/907 |
| 1074711 | 2/1984 | U.S.S.R. | 901/33 X |

OTHER PUBLICATIONS

IBM Tech. Disc. Bul., vol. 16, No. 6, Garrison et al., 11/1973.
IBM Tech. Disc. Bul., vol. 19, No. 2, Wang, 7/1976.
"Automated Mercury Dilatometer", NASA Tech. Briefs, Winter, 1983, p. 227.
"Compliant Tactile Sensor Pad System", by Charles Salerno, Barry Wright Corp., Jun. 1983, 9 pages.
"Integrated Tactile Sensor for Robots", NASA, JPL, NASA Tech. Briefs, Winter, 1983, pp. 233-234.

Primary Examiner—Leslie J. Paperner
Attorney, Agent, or Firm—Samuels, Gauthier, Stevens & Kehoe

[57] ABSTRACT

A tactile sensor which simultaneously provides a compliant interface between a support element and an object to be handled (i.e., a robot gripper in a delicate component), and identifies the contact force and the contact pattern between the object and the support element.

2 Claims, 3 Drawing Sheets

X = ACTIVATED ELEMENTS
≈ = SKIN CONFORMING TO OBJECT

COMPLIANT TACTILE SENSOR

This is a continuation of co-pending application Ser. No. 789,073 filed on Oct. 18, 1985, now abandoned.

BACKGROUND AND BRIEF SUMMARY OF THE INVENTION

In order for robots to effectively perform increasingly more delicate and detailed tasks, it becomes necessary to provide sensory apparatus such as in the hand of the robot, which is functionally equivalent to the various sensors which human workers are naturally endowed, for example, touch. Touch is of particular importance for the tasks such as close-up assembly work, where vision may be obscured by arms or other objects and for providing sensory feedback necessary for gripping delicate objects firmly without causing damage or slippage. Touch can also provide a useful means for discriminating between objects having different sizes, shapes or weights and to determine their orientation.

Tactile sensors have been developed for use with industrial robots. Typically, the tactile sensors currently suggested for use today comprise a printed circuit board or the like as a base, and elastomeric skins embodying conductive elements, piezoelectric elastomers and skins laced with semiconductive coils. The prior art is represented in the following publications: "Compliant Tactile Sensor Pad System", Barry Wright Corporation, published June 1983; "Integrated Tactile Sensor for Robots", NASA Tech Briefs, Winter, 1983; and IBM technical disclosure bulletin, volume 19, no. 2, July 1976; USSR Pat. No. 816,963, and U.S. Pat. No. 4,001,556.

The skins having the desired electrical properties typically suffer in other physical and chemical properties such as a loss of elasticity and/or a loss of chemical inertness. Further, these skins because of the incorporation of the electrical characteristics have increased hysteresis (the phenomena where the output versus load from a tactile sensor being loaded is different from the output versus load when the tactile sensor is being unloaded). Abrasions or cuts or wear to the prior art skins affect their sensing ability in that the abrasion or cut will affect the electrical characteristics incorporated in the skin.

An additional drawback of some prior art tactile sensors is that they are point sensors and, thus, whole areas of the sensor are unable to sense touch. Further, where the prior art sensors are used in the presence of electromagnetic radiation, erroneous signals are created which are reported by the sensor. A further difficulty with some prior art sensors is that they experience cross-talk, which reduces the effective resolution. Resolution is the number of sensing elements per unit area. Cross-talk is the phenomena where sensing elements are falsely activated by activated neighboring elements. Cross-talk results from both the internal wiring of prior art devices and the skin-support interaction. Cross-talk due to internal wiring type sensors is caused by the signal being received and conducted along extraneous paths. Mechanical cross-talk is caused by nonlocalized stress and a sensing skin.

My invention overcomes these prior art problems and provides a high resolution sensor substantially free of cross-talk, which increases substantially the sensing area available to respond to touch. The skin of my sensor does not incorporate any electrical components therein and, thus, may be selected based solely on physical and chemical properties.

Broadly, my invention comprises a tactile sensor wherein a plurality of members are received in a housing. The members are arrayed in a grid-like configuration to define sensing regions in a side-by-side relationship. The sensing regions are electrically isolated from one another. A pressure sensitive skin is secured to the housing and is in communication with the sensing regions. Means are disposed in the housing and in communication with the sensing regions to provide an output in response to a deflection in the skin where the sensing region exists. The sensor does not measure deflection associated directly with the object contact. The sensor measures the compressive stress on the under side of the skin.

DESCRIPTION OF THE PREFERRED EMBODIMENT(S)

Figure 1:
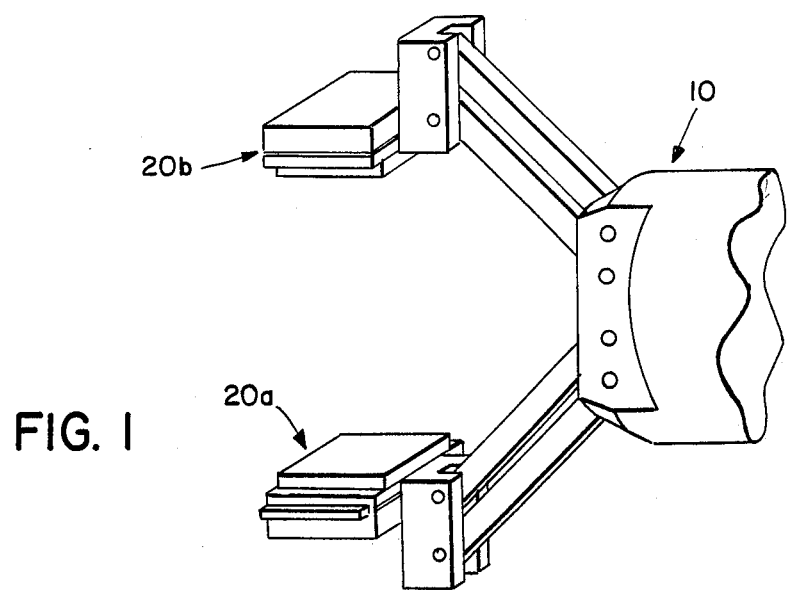
FIG. 1 is a perspective view of a robot gripper with compliant tactile sensors.

In FIG. 1 a robot gripper 10, such as a standard Unimation gripper, has one (or two opposed) tactile sensor(s) 20A (and 20B secured thereto. Tactile sensors of the prior art are commonly secured to such grippers and the method of securing the sensors to a gripper is well understood in the art. Further, the information derived from the sensors of this invention comprises electrical outputs which determine the gripping force and the location and pattern of the object held by the sensors. The electronic communication between the gripper and the computer controlling the robot also uses techniques well known in the art and need not be described in detail in this application.

Figure 2:
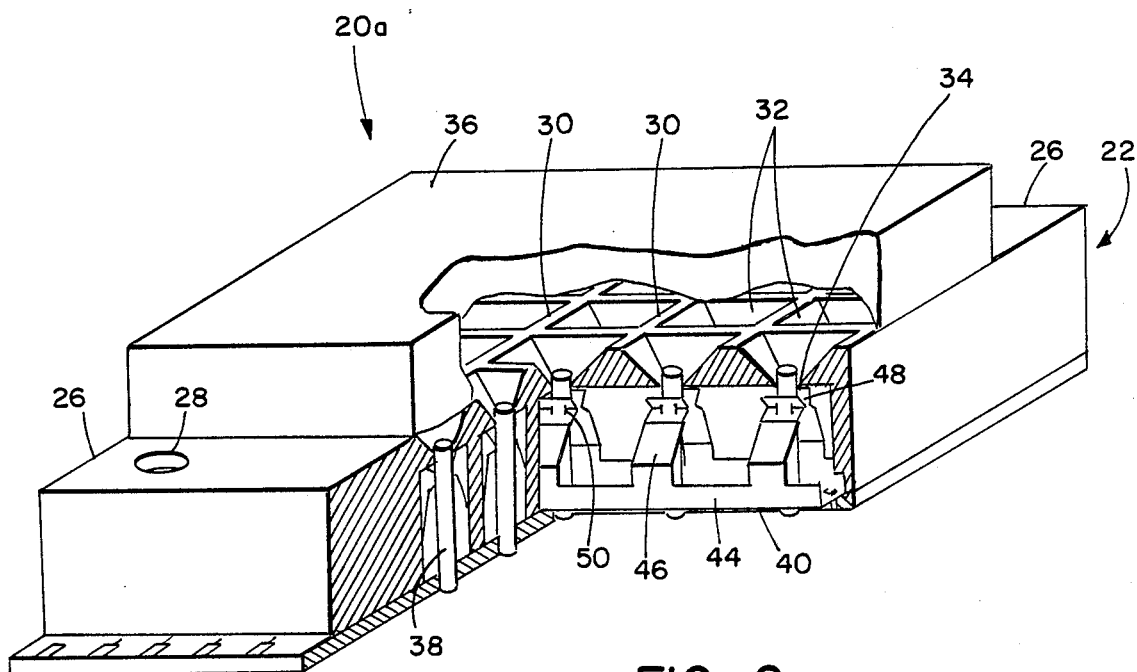
FIG. 2 is a perspective cutaway view of a tactile sensor embodying my invention.

Referring to FIG. 2 the invention will be described in reference to the sensor 20A; (the sensors 20A and 20B being identical). The sensor comprises a housing 22 of generally rectangular shape (although it may be of any geometric configuration) made as one injection molded piece, with mounting holes 28. Members 30 are arrayed in a grid-like configuration to define a plurality of inverted, truncated, pyramidal shaped chambers 32. The chambers 32 are characterized by central openings 34 in their apexes. The bases of the chambers, as will be described, define sensing regions. The sensing regions are one-tenth of an inch apart measured from their centers.

As will become apparent in the following description, the chambers are formed to insure electrical isolation of the chambers one from the other. Although the chambers described in this embodiment are of a particular geometric configuration (truncated pyramid) and the base of the pyramid defines the sensing region as square, the shape of the chamber may vary and the shape of the sensing region may vary to be circular, eliptical, honeycombed, etc.

Figure 4:
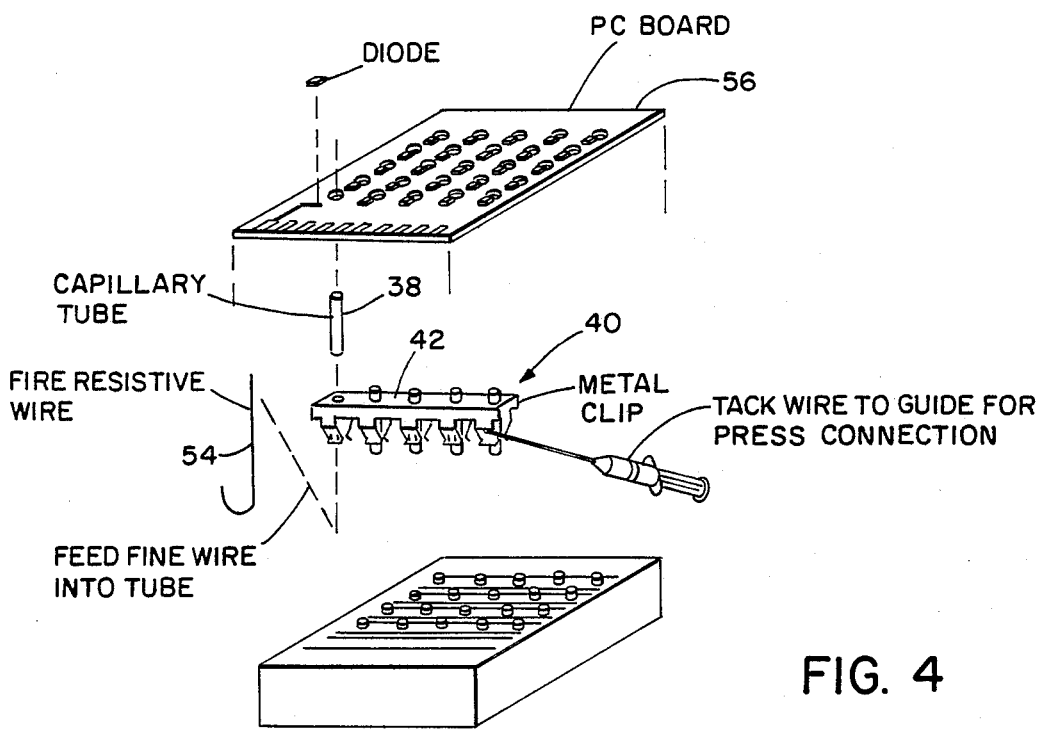

Referring to FIGS. 2 and 4, capillary tubes 38, having a length of 0.4 in. and an outside diameter of 0.028 in. are secured in clip assemblies 40. The clip assemblies 40 comprise a floor 42 and opposed walls 44 formed at right angles to the floor 42. Arms 46 extend upwardly and inwardly from the walls and terminate in outwardly and upwardly extending flanged portions 48 formed at a fold line 50. The fold lines 50 of each set of opposed arms 46 are characterized by recessed concave portions 52, which initially hold the capillary tubes in frictional engagement. A NiCr resistive wire 54 of 0.0007 in diameter passes through the one end of the capillary tube, as shown in FIG. 4, and extends out through the other end of the tube. The wire at this one end (upper end with reference to the skin) of the tube is then folded around and press connected to the clip and the housing and the clip are mated.

The capillary tube 38 - clip assembly 40 combination is received in and supported by the housing. As shown in FIG. 2, the one end of the capillary tubes extend through the apertures and into the chambers shown as 32. Each capillary tube is then sealed in place with adhesive to ensure a fluid tight fit of the capillary tube 38 in the chamber 32. The circuit board 56 is a standard p.c. board such as available from Radio Shack wherein each of the resistive wires 54 which passes through the bottom of the capillary tube 38 contacts a known circuit. That is, the other end of the wire passes through the bottom of the capillary tube and is later connectd to the p.c. board by soldering or welding. The p.c. board is then secured to the housing by screws. The free ends of the wires are received through holes in the p.c. board, and are secured to it by soldering or welding.

Figure 3:
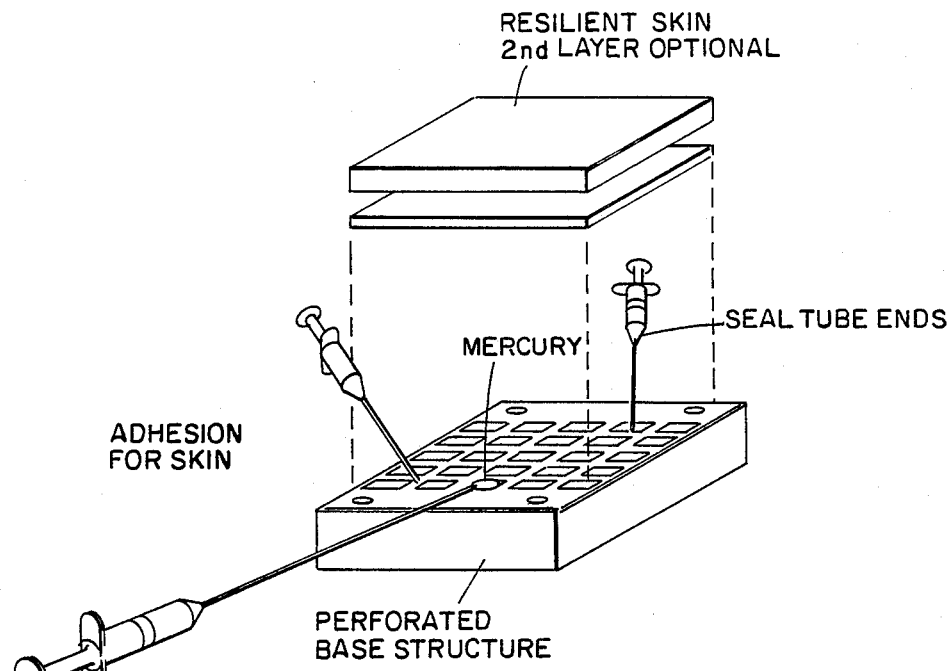
FIGS. 3 and 4 are perspective telescopic views of the sensors of the FIGS. 1 and 2.

Subsequently, a bead of mercury is deposited in the chamber, preferably filling the chamber, which bead of mercury may or may not extend partially into the capillary tube. The upper surfaces of the members 30, and walls 26 lie in the same plane and are coated with an adhesive, such as shown in FIG. 3, and a skin 36 is secured thereto. The skin is a natural rubber compound.

Many of the prior art tactile sensors require skins which are compounded polymers which polymers must embody the desired electrical characteristics. Typically, the incorporation of such additives into the basic polymers changes the physical and/or chemical properties of the polymer or skin such that the skin may not be used in certain corrosive environments, has less susceptibility to abrasion and cuts, and is more easily susceptible to wear. With the tactile sensor of my invention, the primary requirement of the skin is that it be compliant or responsive to compressive sources. Any polymeric material, organic and/or inorganic, such as siloxane polymers and elastomers may be used with my invention. Particularly preferred material for skins are: XR502-20, a natural rubber compound available from Dapro Rubber, Inc.

Although only one skin is shown, it is possible to use a combination of skins to obtain several, accurate pressure ranges. A thin soft layer, say for example 0.05 to 1.0 mm would provide for accurate measurement of light pressures say for example up to 40.0 grams/cm$^2$, and a second layer of more rigid skin would provide a second range of accurate measurements at higher pressures, for example up to 5000 grams per cm$^2$. Thus, skins may be stacked or selected for the desired application.

Prior to actual use, the signal from each resistive wire 54 and each capillary tube is passed through an amplifier circuit and is meausured by a voltmeter. All amplified signals from the capillary tubes are set equal at no load conditions as follows: A suitable voltage is selected, i.e. the mean voltage of all the sensing elements after assembly, and each element is adjusted to this voltage by raising or lowering the level of mercury in the tubes (by adding or subtracting mercury from the chambers). A biasing program stores the digital equivalent of each element's voltage at no load, and all subsequent measurements have the corresponding bias numbers subtracted from them. Thus, each element is referenced to zero at no load.

In addition to the above procedure, the grasping could be controlled by the average pressure of the sensor—that is, "grasp harder until an average pressure threshold is reached." Then determine geometry, orientation, etc. This would ensure that delicate parts would not be damaged from grasping.

Figure 5:
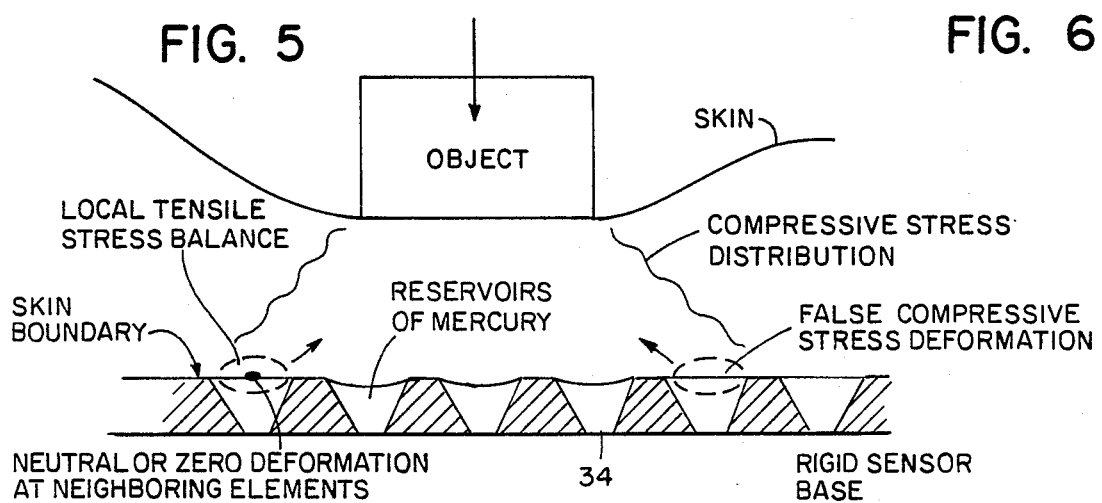
FIG. 5 is a front cross-sectional view of the skin subject to a compressive stress.

Referring to FIG. 5, when the skin is subjected to a compressive force the underside of the skin deforms and the mercury in the chambers is displaced at least partially entering the capillary tube and varying the resistance of the resistive wire. This variance in resistance is sensed as is well understood in the art of tactile sensors (i.e., each element's varying resistance completes a Wheatstone bridge, the voltage output of which is amplified and digitized with standard interfacing hardware; as configured, each element is assigned a memory location in a computer, and the number in the location (0-255) represents the magnitude of the pressure acting on the element.

Figure 6:
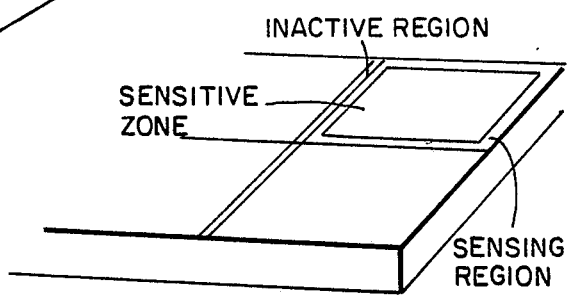
FIG. 6 is a schematic of the sensing regions of the sensor.

Referring to FIG. 6, an important aspect of the invention is more clearly illustrated. A sensing region is defined as a combination of the upper surfaces of the numbers or walls, (inactive zone) and the base of the chamber or open area defined by the members or walls (sensitive zone). This open area constitutes a sensitive zone which in its entirety is responsive to compressive forces. The inactive zone is that portion of the skin which is secured to the members or walls. Thus, with my invention, at least 50% and as a practical matter, more than 75%, preferrably more than 90% of the skin comprises the sensitive zone which is responsive to compressive forces. In addition to substantially increased surface area, available for sensing over prior art devices, there is as shown in FIG. 5 neutral or zero deformation at neighboring elements.

More particularly, the sensor does not measure deflection associated directly with object contact. The sensor measures the deflection due to compressive stress on the underside of the skin. This deflection is more local to the object as explained in the following description.

The compressive stress spreads away from under the object in contact as shown in FIG. 5. If the underside of the skin were supported by a base that was rigid and flat it would cause mechanical cross-talk. The flexibility of the base of the invention (members and chambers) creates a state of tensile stress in the skin at the contact points of the underside of the skin and in the skin directly under the objects. Slightly away from the object there is negligible tensile stress. This imbalance tends to pull the skin from the neighboring elements. This effect counteracts the false compressive deformation and the result is better resolution. A sharper accurate image of the object in contact is provided.

Prior to contacting an object, the sensor is biased so that each element reads zero. Typically, the robot gripper will be instructed to grasp an unidentified part.

Figure 7:
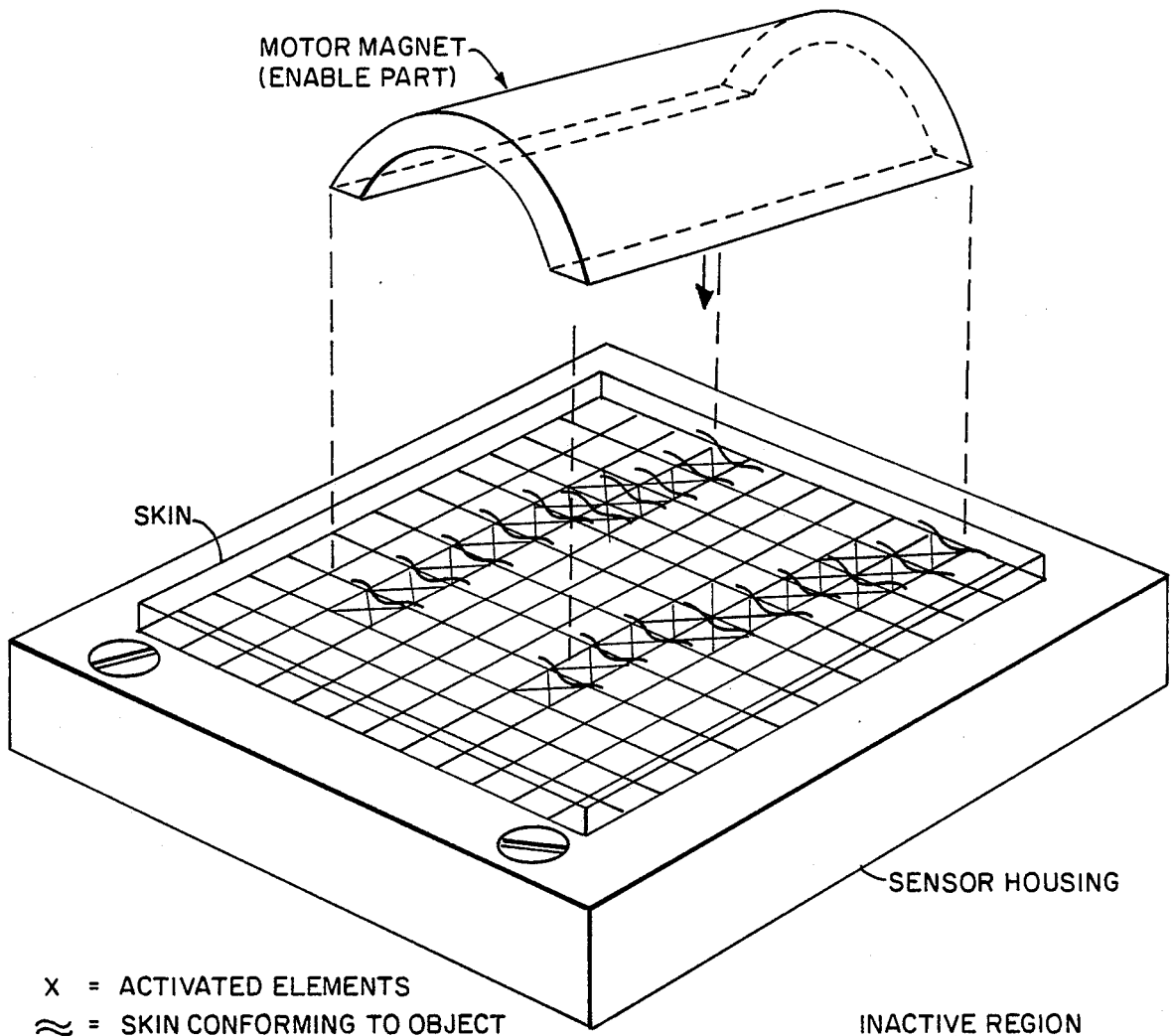
FIG. 7 is a perspective view of a sensed pattern of an object.

After this action is taken, certain sensor elements are activated accordingly to the object in contact, and its orientation, as shown in FIG. 7. The sensor elements are read and signal processing techniques are used to determine the average pressure on the skin, and the geometry and orientation of the part.

Although the preferred embodiment has been described in reference to a combination of a fluid displacement to change the resistance of a resistive wire, any structure which could be responsive to the compressive force is contemplated within the scope of this invention. For example, water based fluids may be used depending upon their physical and electrical properties, particularly surface tension, capillary action, etc. A resistive wire need not specifically be used, the capillary tube in and of itself could function as a resistive wire. Alternatively, the chamber could be shaped such that any displacement of a fluid would result in desired signal. Additionally, a spring biased mechanism or pressure sensitive mechanisms may be disposed below the skin.

Having described my invention what I now claim is:

1. A tactile sensor which comprises:
   (a) a housing;
   (b) a plurality of members in the housing, the members arrayed in a grid-like configuration to define chambers, the members comprising inactive zones and the chambers defined by the members comprising sensitive zones and having fluid disposed therein;
   (c) a tube received in each of the chambers, the tube having a resistive wire therein, the fluid in the chamber when displaced adapted to vary the resistance of the wire which resistance is measured as an electrical output;
   (d) a pressure sensitive skin secured to the housing and in communication with the sensitive zones, the sensitive zones corresponding to more than fifty percent of the total surface area of the skin, the skin being compliant such that when contacted by an object and subjected to a compressive stress the underside of the skin deflects which deflection is sensed by the sensitive zone which is in communication with the deflected skin, the fluid in the chamber underlying said sensitive zone being displaced; and
   (e) output means disposed in the housing and in communication with each of the resistive wires in each of the chambers adapted to provide an output in response to the deflection in that portion of the skin in communication with the sensitive zone.

2. The tactile sensor of claim 1 which includes a printed circuit board to measure the output.

* * * * *